(12) United States Patent
Ryu et al.

(10) Patent No.: US 9,269,985 B2
(45) Date of Patent: Feb. 23, 2016

(54) RECHARGEABLE LITHIUM BATTERY

(75) Inventors: Jae-Yul Ryu, Yongin-si (KR); Joon-Sup Kim, Yongin-si (KR); Jea-Woan Lee, Yongin-si (KR); Jin-Hee Moon, Yongin-si (KR); Wan-Uk Choi, Yongin-si (KR); Young-Ugk Kim, Yongin-si (KR); Chang-Keun Back, Yongin-si (KR); Seung-Hee Park, Yongin-si (KR); Yong-Bum Lee, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 0 days.

(21) Appl. No.: 13/569,736

(22) Filed: Aug. 8, 2012

(65) Prior Publication Data

US 2012/0301792 A1    Nov. 29, 2012

Related U.S. Application Data

(63) Continuation of application No. 12/805,855, filed on Aug. 20, 2010, now Pat. No. 8,268,487.

(30) Foreign Application Priority Data

Nov. 25, 2009   (KR) .................. 10-2009-0114810

(51) Int. Cl.
*H01M 8/00*       (2006.01)
*H01M 10/052*     (2010.01)
*H01M 4/505*      (2010.01)
*H01M 4/525*      (2010.01)
*H01M 4/58*       (2010.01)
*H01M 10/0569*    (2010.01)
*H01M 2/16*       (2006.01)

(52) U.S. Cl.
CPC .......... *H01M 10/052* (2013.01); *H01M 2/1686* (2013.01); *H01M 4/505* (2013.01); *H01M 4/525* (2013.01); *H01M 4/58* (2013.01); *H01M 10/0569* (2013.01); *H01M 2/166* (2013.01); *Y02E 60/122* (2013.01)

(58) Field of Classification Search
CPC ......... Y02E 60/12; Y02E 60/24; Y02E 60/22; H01M 2/1686; H01M 4/32; H01M 2/166; H01M 10/0525; H01M 10/24; H01M 10/052
USPC .................................. 429/252, 249
See application file for complete search history.

(56) References Cited

U.S. PATENT DOCUMENTS 6,113,794 A * 9/2000 Kumar et al. ................. 210/650
8,247,068 B2 * 8/2012 Okuzu et al. ................. 428/328

(Continued)

FOREIGN PATENT DOCUMENTS

| JP | 2000030686 | 1/2000 |
| JP | 2008243805 | 10/2008 |

(Continued)

*Primary Examiner* — Cynthia H Kelly
*Assistant Examiner* — Monique Wills
(74) *Attorney, Agent, or Firm* — Robert E. Bushnell, Esq.

(57) ABSTRACT

Disclosed is a rechargeable lithium battery that includes a positive electrode including a lithium nickel-based positive active material; a negative electrode including a negative active material; an electrolyte including a lithium salt and a non-aqueous organic solvent; and a separator including a polymer substrate and a hydroxide compound-containing coating layer disposed on the polymer substrate.

10 Claims, 1 Drawing Sheet

(56) References Cited

U.S. PATENT DOCUMENTS

| | | | |
|---|---|---|---|
| 2003/0010647 A1* | 1/2003 | Salisbury et al. | 205/560 |
| 2005/0227147 A1 | 10/2005 | Kogetsu et al. | |
| 2007/0231691 A1 | 10/2007 | Abe et al. | |
| 2008/0206652 A1 | 8/2008 | Abe et al. | |
| 2008/0299454 A1 | 12/2008 | Lim | |
| 2009/0004097 A1 | 1/2009 | Jung et al. | |
| 2009/0098450 A1* | 4/2009 | Kikuchi et al. | 429/145 |
| 2009/0136847 A1 | 5/2009 | Jeong et al. | |
| 2009/0325061 A1 | 12/2009 | Lim | |
| 2010/0099022 A1 | 4/2010 | Nishida et al. | |
| 2011/0143185 A1* | 6/2011 | Nishikawa | 429/145 |

FOREIGN PATENT DOCUMENTS

| | | |
|---|---|---|
| JP | 2008300349 | 12/2008 |
| KR | 1020080086437 | 9/2008 |
| KR | 1020080106888 | 12/2008 |
| KR | 100898293 B | 5/2009 |
| KR | 1020090061571 | 6/2009 |

* cited by examiner

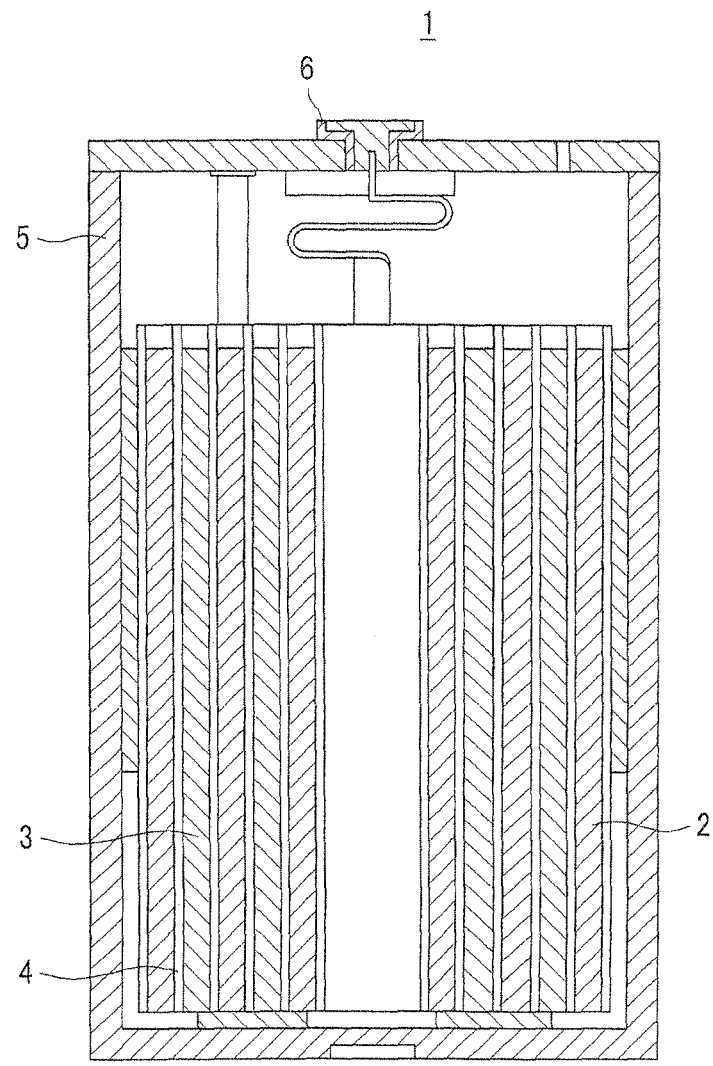

RECHARGEABLE LITHIUM BATTERY

CROSS-REFERENCE TO RELATED APPLICATIONS

This application makes reference to, incorporates the same herein, and claims all benefits accruing under 35 U.S.C. §120 as a Continuation of, U.S. Ser. No. 12/805,855 filed on 20 Aug. 2010, now U.S. Pat. No. 8,268,487. All benefits under 35 U.S.C. §120 are claimed.

This application also claims priority from Korean Patent Application No. 10-2009-0114810, entitled RECHARGEABLE LITHIUM BATTERY, filed 25 Nov. 2009, the entire contents of which are incorporated herein by reference. All rights of priority and benefits available under 35 U.S.C. §119 are claimed.

BACKGROUND OF THE INVENTION

1. Field of the Invention

This disclosure relates to a rechargeable lithium battery.

2. Description of the Related Art

Lithium rechargeable batteries have recently drawn attention as a power source for small portable electronic devices. They use an organic electrolyte solution, and thereby have twice the discharge voltage of a conventional battery using an alkaline aqueous solution and, accordingly, high energy density. Such a rechargeable lithium battery includes a positive electrode, a negative electrode, and an electrolyte.

For positive active materials of a rechargeable lithium battery, composite metal oxides such as $LiCoO_2$, $LiMn_2O_4$, $LiNi_{1-x}Co_xO_2$ ($0<x<1$), and the like have been suggested. As for negative active materials of a rechargeable lithium battery, various carbon-based materials such as artificial graphite, natural graphite, and hard carbon, or non-carbon-based materials such as silicon, tin oxide, lithium vanadium-based oxide, and the like have been suggested. A separator is disposed between positive and negative electrodes for separating the electrodes and generally, includes polymer films including insulating polymers such as polyethylene, polypropylene, and the like.

SUMMARY OF THE INVENTION

One aspect of this disclosure provides a rechargeable lithium battery having excellent cycle-life at high temperatures.

According to one aspect of this disclosure, a rechargeable lithium battery is provided that includes a positive electrode including a positive active material comprising lithium and nickel; a negative electrode including a negative active material; an electrolyte including a lithium salt and a non-aqueous organic solvent; and a separator including a polymer substrate and a coating layer comprising a hydroxide compound disposed on the polymer substrate.

The hydroxide compound may include $Al(OH)_3$, $Mg(OH)_2$, $Ti(OH)_4$, $Si(OH)_4$, or a combination thereof.

The coating layer may further include a heat-resistant resin.

The polymer substrate may be a substrate including a polyolefin resin.

The non-aqueous organic solvent includes an ethylene carbonate organic solvent represented by the following Chemical Formula 4, (hereinafter, referred to "ethylene carbonate-based organic solvent"), and the ethylene carbonate-based organic solvent may be included in an amount of about 10 to 30 wt % based on the total amount of the non-aqueous organic solvent. The ethylene carbonate-based organic solvent may include fluoroethylene carbonate.

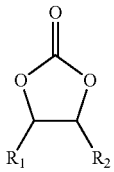

Chemical Formula 4

In the above Chemical Formula 4, $R_1$ and $R_2$ are the same or different, and are hydrogen, a halogen, a cyano (CN), a nitro ($NO_2$), or a substituted alkyl, provided that at least one of $R_1$ and $R_2$ is a halogen or a substituted alkyl. The alkyl may be a C1 to C5 alkyl. The substituted alkyl may be an alkyl in which at least one hydrogen is substituted with fluorine.

The negative active material includes Si, $SiO_x$ ($0<x<2$), a Si-Q alloy, or a combination thereof. Herein, Q is an alkali metal, an alkaline-earth metal, a Group 13 element, a Group 14 element, transition elements, or a rare earth element, or a combination thereof, provided that Q is not Si.

The positive active material may include at least one of compounds represented by the following Chemical Formulae 1 to 3, or a combination thereof.

Chemical Formula 1

In the Chemical Formula 1, $0.8 \leq g \leq 2$, $0 \leq h \leq 1$, e is 1 to 2, $0 \leq j \leq 1$, and
L is Al, Mn, Mg, Zr, or La, or a combination thereof.

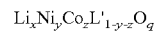

Chemical Formula 2

In the Chemical Formula 2, $0.65 \leq x \leq 1$, $0 \leq y \leq 1$, $0 \leq z \leq 1$, $0 \leq y+z \leq 1$, q ranges from 1.8 to 2, and
L' is Al, Mn, Mg, Zr, or La, or a combination thereof.

Chemical Formula 3

In the above Chemical Formula 3, M is $M'_{1-k}A_k$ (M' is $Ni_{1-d-e}Mn_dCo_e$, $0.65 \leq d+e \leq 0.85$, $0.1 \leq e \leq 0.4$, A is a dopant, and $0 \leq k < 0.05$),
L is F, S, or P, or a combination thereof,
$0.95 \leq x \leq 1.05$, and
$0 \leq z \leq 2$.

The rechargeable lithium battery may be a high voltage rechargeable lithium battery having an operating voltage of about 4.35V to about 4.5V.

The rechargeable lithium battery has improved room temperature and high temperature cycle-lives.

BRIEF DESCRIPTION OF THE DRAWING

FIG. 1 is a schematic view of a rechargeable lithium battery according to one embodiment.

DETAILED DESCRIPTION OF THE INVENTION

Exemplary embodiments will hereinafter be described in detail. However, these embodiments are only exemplary, and this disclosure is not limited thereto.

The rechargeable lithium battery according to one embodiment includes a positive electrode including a lithium nickel positive active material; a negative electrode including a negative active material; an electrolyte including a lithium salt and a non-aqueous organic solvent; and a separator.

The rechargeable lithium battery may be a high voltage rechargeable lithium battery having an operating voltage of about 4.35V to about 4.5V.

The separator includes a polymer substrate and a hydroxide compound-containing coating layer disposed on the polymer substrate. The coating layer may be disposed on one side of polymer substrate or both sides of the polymer substrate.

The hydroxide compound may include $Al(OH)_3$, $Mg(OH)_2$, $Ti(OH)_4$, or $Si(OH)_4$, or a combination thereof. When this hydroxide compound is disposed into a coating layer, it has weak particle strength, particularly weaker than an oxide like alumina, and thus, may produce a particle less worn out while mixed. Accordingly, there may be less impurities, improving the process.

The coating layer may further include a heat-resistant resin as a binder. Such a heat-resistant resin includes an aramid resin, a polyamideimide resin, or a polyimide resin, or a combination thereof.

The aramid resin indicates an aromatic polyamide resin, and for example, includes a meta-aramid resin in which phenyl groups are all linked into a backbone chain via meta-linkage except for an amide group, or a para-aramid resin in which phenyl groups are all linked into a backbone chain via para-linkage except for an amide group.

In addition, any heat-resistant resin supplying heat resistance, but having no bad influence, may be used.

In other words, the coating layer may be disposed by mixing a hydroxide compound and a heat-resistant resin in a solvent and coating the composition on a polymer substrate. The solvent may be volatilized during the drying, leaving only the hydroxide compound and the aramid resin in the coating layer.

Herein, the hydroxide compound and the heat-resistant resin are mixed in a ratio ranging from 50:50 to 90:10 wt % but in another embodiment, ranging from 60:40 to 80:20 wt %. When they are mixed within the ratio range, they may bring about appropriate pore formation, control of metal ion elution, easy coating of a separator, and heat resistance.

Since the hydroxide compound and the heat-resistant resin are mixed within the ratio and form a coating layer, they may be left in the coating layer within the same ratio.

In addition, the solvent may include any organic solvent that may dissolve the heat-resistant resin and for example, may include N-methylpyrrolidone.

The polymer substrate may be a substrate including a polyolefin. The polyolefin includes a polyethylene-based resin, or a polypropylene-based resin, or a combination thereof.

Specific examples may include a polyethylene-based resin such as low density polyethylene, linear polyethylene (ethylene-α-olefin copolymer), high density polyethylene, and the like or a polypropylene-based resin such as polypropylene, ethylene-propylene copolymer, and the like.

The polymer substrate may be 8 to 20 μm thick but in another embodiment, 10 to 15 μm thick. When it has a thickness within these ranges, it may bring about appropriate shut-down function effects.

The hydroxide compound-containing coating layer may be 2 to 8 μm thick but in another embodiment, 4 to 6 μm thick. When it has a thickness within these ranges, it may appropriately maintain heat resistance and thereby, suppress thermal contraction and control metal ion elution.

According to one embodiment of the present invention, since a separator includes a hydroxide compound-containing coating layer on the surface of a polymer substrate, the polymer substrate does not directly contact an active material layer.

When a polymer substrate used for a separator directly contacts with an active material layer, the active material works as an oxidizing catalyst and oxidizes the polymer, eluting a metal ion (particularly severe at a high temperature). However, a separator according to one embodiment of the present invention can make an active material layer not in direct contact with a polymer substrate and thus, suppresses elution of metal ions.

In particular, a polymer substrate is severely oxidized through direct contact with an active material layer when a lithium nickel-based compound is used as a positive active material. Accordingly, a separator including a hydroxide compound-containing coating layer on the surface of a polymer substrate according to one embodiment of the present invention may have maximum effects when a lithium nickel-based compound is used as a positive active material for a rechargeable lithium battery.

The lithium nickel-based compounds are compounds comprising both Li and Ni and may include compounds represented by the following Chemical Formulas 1 to 3 or a combination thereof.

    Chemical Formula 1

In the Chemical Formula 1, $0.8 \leq g \leq 2$, $0 \leq h \leq 1$, e is 1 to 2, $0 \leq j \leq 1$, and L is Al, Mn, Mg, Zr, or La, or a combination thereof.

    Chemical Formula 2

In the Chemical Formula 2, $0.65 \leq x \leq 1$, $0 \leq y \leq 1$, $0 \leq z \leq 1$, $0 \leq y+z \leq 1$, q ranges from 1.8 to 2, and L' is Al, Mn, Mg, Zr, or La, or a combination thereof.

    Chemical Formula 3

In the above Chemical Formula 3, M is $M'_{1-k}A_k$ (M' is $Ni_{1-d-e}Mn_dCo_e$, $0.65 \leq d+e \leq 0.85$, $0.1 \leq e \leq 0.4$, A is a dopant, for example B, Ca, Zr, S, F, P, Bi, Al, Mg, Zn, Sr, Cu, Fe, Ga, In, Cr, Ge, or Sn, and $0 \leq k < 0.05$), L is F, S, or P, or a combination thereof, $0.95 \leq x \leq 1.05$, and $0 \leq z \leq 2$.

In a rechargeable lithium battery according to one embodiment, the negative electrode includes a Si-based negative active material, for example Si, $SiO_x$ ($0 < x < 2$), a Si-Q alloy, or a combination thereof. Herein, Q is an alkali metal, an alkaline-earth metal, a Group 13 element, a Group 14 element, transition elements, or a rare earth element, or a combination thereof, provided that Q is not Si.

In a rechargeable lithium battery according to one embodiment, an electrolyte includes a lithium salt and a non-aqueous organic solvent. The non-aqueous organic solvent includes ethylene carbonate-based organic solvent by the following Chemical Formula 4. In addition, the rechargeable lithium battery according to one embodiment of the present invention does not have shortcomings regarding degradation of cycle-life characteristics at high temperatures. Especially, this effect may be more suitably obtained in the rechargeable lithium battery with a Si-based negative active material, since this battery includes an electrolyte with an excess ethylene carbonate-based organic solvent in order to improve cycle-life characteristics at room temperature.

Accordingly, among the non-aqueous organic solvents, an ethylene carbonate-based organic solvent of the following Chemical Formula 4 may be used in an amount of 10 to 30 wt % based on the entire weight of a non-aqueous organic solvent, but in another embodiment, in an amount of 15 to 25 wt %. When the ethylene carbonate-based organic solvent of the following Chemical Formula 4 is used as a non-aqueous organic solvent for an electrolyte, and especially, when it is used in an amount of 10 to 30 wt % based on the entire weight of a non-aqueous organic solvent, room temperature cycle-life characteristic of a rechargeable lithium battery including an Si-based negative active material may be improved.

Chemical Formula 4

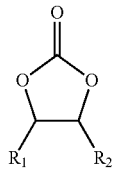

In the above Chemical Formula 4, $R_1$ and $R_2$ are the same or different and are hydrogen, a halogen, a cyano (CN), or a nitro ($NO_2$), or a substituted alkyl, provided that at least one of $R_1$ and $R_2$ is a halogen, or a substituted alkyl. The alkyl may be a C1 to C5 alkyl. The substituted alkyl may be an alkyl in which at least one hydrogen is substituted with fluorine.

The compounds of the above Chemical Formula 4 include difluoro ethylenecarbonate, chloroethylene carbonate, dichloroethylene carbonate, bromoethylene carbonate, dibromoethylene carbonate, nitroethylene carbonate, cyanoethylene carbonate, or fluoroethylene carbonate, or a combination thereof. According to another embodiment of the present invention, a compound represented by the above Chemical Formula 4 may be fluoroethylene carbonate.

The non-aqueous organic solvent may include an ethylene carbonate-based organic solvent represented by the above Chemical Formula 4 as a first solvent and a carbonate-based solvent including no halogen as a second solvent. The second solvent may include ester-based, ether-based, ketone-based, alcohol-based, or aprotic solvent, or a combination thereof along with the carbonate-based solvent. For the second solvent, the carbonate-based solvent includes dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), or butylene carbonate (BC), or a combination thereof.

The ester-based solvent may include methyl acetate, ethyl acetate, n-propyl acetate, dimethylacetate, methylpropinonate, ethylpropinonate, γ-butyrolactone, decanolide, valerolactone, mevalonolactone, or caprolactone, or a combination thereof. The ether-based solvent may include dibutyl ether, tetraglyme, diglyme, dimethoxyethane, 2-methyltetrahydrofuran, or tetrahydrofuran, or a combination thereof.

The ketone-based solvent may include cyclohexanone, and the alcohol-based solvent may include ethanol, isopropyl alcohol, or a combination thereof. The aprotic solvent may include nitriles such as R—CN (wherein R is a C2 to C20 linear, branched, or cyclic hydrocarbon, a double bond, an aromatic ring, or an ether bond); amides such as dimethyl formamide, or dimethyl acetamide; dioxolanes such as 1,3-dioxolane; sulfolanes; or a combination thereof.

The second solvent may be used singularly or as a mixture. When the organic solvent is used as a mixture, the mixture ratio can be controlled in accordance with a desirable battery performance.

When the second solvent is a carbonate-based solvent, a mixture of a cyclic carbonate and a linear carbonate may be used. The cyclic carbonate and the linear carbonate are mixed together in a volume ratio of 1:1 to 1:9, and when this mixture is used as an electrolyte, the electrolyte performance may be enhanced.

For the second solvent, a mixture of carbonate-based solvents and aromatic hydrocarbon-based solvents may be used. The carbonate-based solvents and the aromatic hydrocarbon-based solvents are mixed together in a volume ratio of 1:1 to 30:1.

The aromatic hydrocarbon-based organic solvent may be represented by the following Chemical Formula 5.

Chemical Formula 5

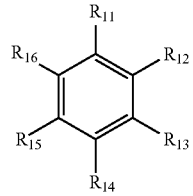

In the above Chemical Formula 5, $R_{11}$ to $R_{16}$ are the same or different, and are hydrogen, halogen, a C1 to C10 alkyl, or a C1 to C10 haloalkyl, or a combination thereof.

The aromatic hydrocarbon-based organic solvent may include at least one of benzene, fluorobenzene, 1,2-difluorobenzene, 1,3-difluorobenzene, 1,4-difluorobenzene, 1,2,3-triuorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, or xylene, or a combination thereof.

The electrolyte may include vinylene carbonate to improve battery cycle-life. The amount of the vinylene carbonate is controlled to improve cycle-life.

The electrolyte may include a nitrile-based additive to improve high temperature cycle-life characteristics. The nitrile-based additive includes succinonitrile, glutaronitrile, adiponitrile, pimelonitrile, or suberonitrile, or a combination thereof. The nitrile-based additive may be used in an amount of about 3 to about 5 wt % based on the weight of the electrolyte including the non-aqueous organic solvent and a lithium salt.

The lithium salt supplies lithium ions in the battery, and so performs a basic operation of a rechargeable lithium battery, and improves lithium ion transport between positive and negative electrodes. Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2, C_yF_{2y+1}SO_2$, (where x and y are natural numbers), LiCl, LiI, or $LiB(C_2O_4)_2$ ((lithium bis(oxalato)borate; LiBOB).

The lithium salt may be used in a concentration ranging from about 0.1 M to about 2.0 M. When the lithium salt is included at the above concentration range, electrolyte performance and lithium ion mobility may be enhanced due to optimal electrolyte conductivity and viscosity.

According to one embodiment of the present invention, the positive and negative electrodes respectively include a current collector and an active material layer formed thereon and including an active material.

When the active material layer is a positive active material layer, a positive active material may be included in an amount of 90 to 98 wt % based on the entire weight of the active material layer.

The positive active material layer may further include a binder and a conductive material other than the positive active material. Herein, the binder and the conductive material may be respectively included in an amount of 1 to 5 wt % based on the entire weight of the positive active material layer.

The binder plays a role of attaching positive active material particles together and also, a positive active material to a current collector. Examples include polyvinylalcohol, carboxylmethylcellulose, hydroxypropylcellulose, diacetylcellulose, polyvinylchloride, carboxylized polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylate styrene-butadiene rubber, an epoxy resin, nylon, and the like but is not limited thereto.

The conductive material is used to apply conductivity to an electrode. It may include any conductive material unless it may cause a chemical change in a battery and can be for example, metal powder such as natural graphite, artificial graphite, carbon black, acetylene black, ketjenblack, carbonfiber, copper, nickel, aluminum, silver, and the like, metal fiber, and the like. In addition, it may include at least one conductive material such as polyphenylene derivative and the like or a combination of more than one of the above.

The current collector may include Al but is not limited thereto.

The positive active material layer may be formed by coating a positive active material composition prepared by mixing a positive active material, a binder, a conductive material, and an organic solvent as slurry on a current collector. The solvent may include N-methylpyrrolidone and the like but is not limited thereto. On the other hand, a method of manufacturing the positive electrode is well-known in the art and thus is not illustrated in detail.

When the active material layer is a negative active material layer, a negative active material may be included in an amount of 85 to 95 wt % based on the entire weight of the negative active material layer.

The negative active material layer may also include a binder and selectively a conductive material. The binder may be included in an amount of 1 to 5 wt % based on the entire amount of a negative active material. In addition, when the negative active material layer includes a conductive material, it may include a negative active material in an amount of 85 to 95 wt %, a binder in an amount of 5 to 15 wt %, and a conductive material in an amount of 0 to 5 wt %.

The binder plays a role of attaching negative active material particles to one another and a negative active material to a current collector. The binder may include a non-water-soluble binder, a water-soluble binder, or a combination thereof.

The non-water-soluble binder may include polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, or polyimide, or a combination thereof.

The water-soluble binder may include styrene-butadiene rubber, acrylated styrene-butadiene rubber, polyvinylalcohol, sodium polyacrylate, an olefin copolymer with propylene and 2 to 8 carbons, or a copolymer of (metha)acrylic acid and (metha)acrylic acid and alkylester, or a combination thereof.

When the negative electrode binder is a water-soluble binder, it may further include a cellulose-based compound being able to enhance viscosity. The cellulose-based compound may include carboxylmethyl cellulose, hydroxypropylmethyl cellulose, methyl cellulose, or an alkali metal salt thereof, or a combination thereof. The alkali metal may include Na, K, or Li. It may be used in an amount of 0.1 to 3 parts by weight based on 100 parts by weight of a binder.

The conductive material is used to supply conductivity to an electrode. However, it may include any conductive material unless it may cause any chemical change. Examples of the conductive material may include a carbon-based material such as natural graphite, artificial graphite, carbon black, acetylene black, ketjen black, carbon fiber, and the like; a metal-based material such as metal powder such as copper, nickel, aluminum, silver, and the like, metal fiber, or the like; and a conductive material such as a conductive polymer such as polyphenylene derivative and the like or a mixture thereof.

The current collector may include a copper film, a nickel film, a stainless steel film, a titanium film, a nickel foam, a copper foam, or a polymer substrate coated with a conductive material, or a combination thereof.

The negative electrode is prepared by preparing a negative active material composition prepared by mixing a negative active material, a binder and selectively a conductive material in a solvent and coating the composition on a current collector. This method of manufacturing an electrode is well-known in the art and is not illustrated in detail. When the solvent includes a non-water-soluble binder, it may be an organic solvent such as N-methylpyrrolidone and the like. When it includes a water-soluble binder, it may be water but is not limited thereto.

FIG. 1 shows the structure of a rechargeable lithium battery according to one embodiment of the present invention. However, the rechargeable lithium battery of the present invention is not limited to the structure shown in FIG. 1, but includes any shape such as cylinder, prism, coin, pouch, and the like. As shown in FIG. 1, the rechargeable lithium battery 1 may include a negative electrode 2, a positive electrode 3, and a separator 4 disposed between the negative electrode 2 and positive electrode 3, an electrolyte (not shown) impregnated between the negative electrode 2, the positive electrode 3, and the separator 4, a battery case 5, and a sealing member 6 sealing the battery case 5.

The following examples illustrate this disclosure in more detail. The following examples are not more than specific examples of this disclosure, and the scope of this disclosure is not limited by the Examples.

Example 1

94 wt % of a mixed positive active material of $LiNi_{0.8}Co_{0.15}Al_{0.05}O_2$ and $Li_2NiO_2$ in a ratio of 90 wt %: 10 wt %, 3 wt % of a carbon black conductive material, and 3 wt % of a polyvinylidene fluoride binder were mixed in N-methylpyrrolidone to prepare a positive active material slurry. This slurry was coated on an aluminum foil current collector and then, dried and compressed, preparing a positive electrode.

92 wt % of a $SiO_x$ (x=0.99) negative active material and 8 wt % of a polyamideimide binder were mixed in N-methylpyrrolidone, preparing negative active material slurry. This slurry was coated on a copper foil current collector and then, dried and compressed, preparing a negative electrode.

Next, a mixed solvent was prepared by mixing fluoroethylene carbonate, ethylene carbonate, ethylmethyl carbonate, and diethylcarbonate in a ratio of 10 volume %:20 volume %:20 volume %:50 volume % ratio, and 1.3M of $LiPF_6$ was added thereto. Then, succinonitrile was added to this mixture in an amount of 5 wt % based on the entire weight of the mixture, preparing an electrolyte.

$Al(OH)_3$ and a meta-aramid resin was mixed in a ratio of 80:20 wt % in an N-methylpyrrolidone solvent to prepare a coating layer composition. The coating layer composition was coated on both sides of a 10 μm-thick polyethylene substrate to prepare a separator. The coating layer including $Al(OH)_3$ and an aramid resin was formed to be 5 μm thick.

The positive electrode, the negative electrode, the electrolyte, and the separator were used to fabricate a lithium fuel cell.

Example 2

A mixed solvent was prepared by mixing fluoroethylene carbonate, ethylene carbonate, ethylmethyl carbonate, and diethylcarbonate in a ratio of 20 volume %:10 volume %:20 volume %:50 volume %, and 1.0M of $LiPF_6$ was added thereto. Next, succinonitrile was added to this mixture in an amount of 5 wt % based on the entire weight of the mixture, preparing an electrolyte. Then, a lithium fuel cell was fabricated according to the same method as Example 1 except for the electrolyte.

Example 3

Fluoroethylene carbonate, ethylmethyl carbonate, and diethylcarbonate were mixed in a ratio of 30 volume %:20 volume %:50 volume % to prepare a mixed solvent, and 1.0M $LiPF_6$ was added thereto. Succinonitrile was added to the resulting mixture in an amount of 5 wt % based on the entire weight of the mixture, preparing an electrolyte. Then, a lithium fuel cell was fabricated according to the same method as Example 1 except for the electrolyte.

Example 4

A mixed solvent was prepared by mixing ethylene carbonate, ethylmethyl carbonate, and diethylcarbonate in a weight ratio of 30 volume %:20 volume %:50 volume %, and 1.3M of $LiPF_6$ was added thereto. Next, succinonitrile was added to the resulting mixture in an amount of 5 wt % based on the entire weight of the mixture, preparing an electrolyte. Then, a lithium fuel cell was fabricated according to the same method as Example 1 except for the electrolyte.

Example 5

$Mg(OH)_2$ and a meta-aramid resin were mixed in a ratio of 80:20 wt % in an N-methylpyrrolidone solvent to prepare a coating layer composition. This coating layer composition was coated to be 5 μm thick on both sides of a 10 μm-thick polyethylene substrate, fabricating a separator. The coating layer included $Mg(OH)_2$ and an aramid resin.

94 wt % of a mixed positive active material prepared by mixing $LiNi_{0.8}Co_{0.15}Al_{0.05}O_2$ and $Li_2NiO_2$ in a ratio of 90 wt %:10 wt %, 3 wt % of a carbon black conductive material, and 3 wt % of a polyvinylidene fluoride binder were mixed in N-methylpyrrolidone to prepare a positive active material slurry. This slurry was coated on an aluminum foil current collector and then, dried and compressed, fabricating a positive electrode.

92 wt % of a $SiO_x$ (x=0.99) negative active material and 5 wt % of a polyamideimide binder were mixed in N-methylpyrrolidone, preparing a negative active material slurry. This slurry was coated on a copper foil current collector and then, dried and compressed, fabricating a negative electrode.

A mixed solvent was prepared by mixing fluoroethylene carbonate, ethylene carbonate, ethylmethyl carbonate, and diethylcarbonate in a ratio of 10 volume %:20 volume %:20 volume %:50 volume %, and 1.3M $LiPF_6$ was added thereto. Next, succinonitrile was added to the resulting mixture in an amount of 5 wt % based on the entire weight of the mixture, preparing an electrolyte.

The separator, the positive electrode, the negative electrode, and the electrolyte were used to fabricate a lithium fuel cell.

Example 6

A mixed solvent was prepared by mixing fluoroethylene carbonate, ethylene carbonate, ethylmethyl carbonate, and diethylcarbonate in a ratio of 20 volume %:10 volume %:20 volume %:50 volume %, and 1.0M of $LiPF_6$ was added thereto. Next, succinonitrile was added to the resulting mixture in an amount of 5 wt % based on the entire weight of the mixture, preparing an electrolyte. Then, a lithium fuel cell was fabricated according to the same method as Example 5 except for the electrolyte.

Example 7

A mixed solvent was prepared by mixing fluoroethylene carbonate, ethylmethyl carbonate, and diethylcarbonate in a ratio of 30 volume %:20 volume %:50 volume %, and LOM of $LiPF_6$ was added to thereto. Next, succinonitrile was added to the resulting mixture in an amount of 5 wt % based on the entire weight of the mixture, preparing an electrolyte. Then, a lithium fuel cell was fabricated according to the same method as Example 5 except for the electrolyte.

Example 8

A mixed solvent was prepared by mixing ethylene carbonate, ethylmethyl carbonate, and diethylcarbonate in a ratio of 30 volume %:20 volume %:50 volume %, and 1.3M of $LiPF_6$ was added thereto. Next, succinonitrile was added to the resulting mixture in an amount of 5 wt % based on the entire weight of the mixture, preparing an electrolyte. Then, a lithium fuel cell was fabricated according to the same method as Example 5 except for the electrolyte.

Comparative Example 1

94 wt % of a positive active material prepared by mixing $LiNi_{0.8}Co_{0.15}Al_{0.05}O_2$ and $Li_2NiO_2$ in a ratio of 90 wt %:10 wt %, 3 wt % of a carbon black conductive material, and 3 wt % of a polyvinylidene fluoride binder were mixed in N-methylpyrrolidone, preparing positive active material slurry. This slurry was coated on an aluminum foil current collector and then, dried and compressed, fabricating a positive electrode.

92 wt % of a $SiO_x$ (x=0.99) negative active material and 8 wt % of a polyamideimide binder were mixed in N-methylpyrrolidone to prepare a negative active material slurry. This slurry was coated on a copper foil current collector and then, dried and compressed, fabricating a negative electrode.

In addition, fluoroethylene carbonate, ethylene carbonate, ethylmethyl carbonate, and diethylcarbonate were mixed in a ratio of 10 volume %:20 volume %:20 volume %:50 volume % to prepare a mixed solvent, and 1.3M of LiPF$_6$ was added thereto. Next, succinonitrile was added to the resulting mixture in an amount of 5 wt % based on the entire weight of the mixture, preparing an electrolyte.

As for a separator, used was a 20 µm-thick polyethylene film. The positive electrode, the negative electrode, the electrolyte, and the separator were used to fabricate a lithium fuel cell.

Comparative Example 2

A mixed solvent was prepared by mixing fluoroethylene carbonate, ethylene carbonate, ethylmethyl carbonate, and diethylcarbonate in a ratio of 20 volume %:10 volume %:20 volume %:50 volume %, and 1.0M of LiPF$_6$ was added thereto. Next, succinonitrile was added to the mixture in an amount of 5 wt % based on the entire weight of the mixture, preparing an electrolyte. Then, a lithium fuel cell was fabricated according to the same method as Comparative Example 1 except for the electrolyte.

Comparative Example 3

A mixed solvent was prepared by mixing fluoroethylene carbonate, ethylmethyl carbonate, and diethylcarbonate in a ratio of 30 volume %:20 volume %:50 volume %, and 1.0M of LiPF$_6$ was added thereto. Next, succinonitrile was added to the resulting mixture in an amount of 5 wt % based on the entire weight of the mixture, preparing an electrolyte. Then, a lithium fuel cell was fabricated according to the same method as Comparative Example 1 except for the electrolyte.

Comparative Example 4

A mixed solvent was prepared by mixing ethylene carbonate, ethylmethyl carbonate, and diethylcarbonate in a ratio of 30 volume %:20 volume %:50 volume %, and 1.3M of LiPF$_6$ was added thereto. Next, succinonitrile was added to the resulting mixture in an amount of 5 wt % based on the entire weight of the mixture, preparing an electrolyte. Then, a lithium fuel cell was fabricated according to the same method as Comparative Example 1 except for the electrolyte.

Comparative Example 5

Positive active material slurry was prepared by mixing 94 wt % of a LiCoO$_2$ positive active material, 3 wt % of a carbon black conductive material, and 3 wt % of a polyvinylidene fluoride binder in N-methylpyrrolidone. The slurry was coated on an aluminum foil current collector and then, dried and compressed, fabricating a positive electrode.

92 wt % of a SiO$_x$ (x=0.99) negative active material and 8 wt % of a polyamideimide binder were mixed in N-methylpyrrolidone to prepare a negative active material slurry. This slurry was coated on a copper foil current collector and then, dried and compressed, fabricating a negative electrode.

In addition, a mixed solvent was prepared by mixing fluoroethylene carbonate, ethylene carbonate, ethylmethyl carbonate, and diethylcarbonate in a ratio of 10 volume %:20 volume %:20 volume %:50 volume %, and 1.3M of LiPF$_6$ was added thereto. Next, succinonitrile was added to the resulting mixture in an amount of 5 wt % based on the entire weight of the mixture, preparing an electrolyte.

Then, the positive electrode, the negative electrode, the electrolyte, and a 20 µm-thick polyethylene film separator were used to fabricate a lithium fuel cell.

Comparative Example 6

A mixed solvent was prepared by mixing fluoroethylene carbonate, ethylene carbonate, ethylmethyl carbonate, and diethylcarbonate in a ratio of 20 volume %:10 volume %:20 volume %:50 volume %, and 1.0M of LiPF$_6$ was added thereto. Next, succinonitrile was added to the mixture in an amount of 5 wt % based on the entire weight of the mixture, preparing an electrolyte. Then, a lithium fuel cell was fabricated according to the same method as Comparative Example 5 except for the electrolyte.

Comparative Example 7

A mixed solvent was prepared by mixing fluoroethylene carbonate, ethylene carbonate, ethylmethyl carbonate, and diethylcarbonate in a ratio of 30 volume %:20 volume %:50 volume %, and 1.0M of LiPF$_6$ was added thereto. Next, succinonitrile was added to the mixture in an amount of 5 wt % based on the entire weight of the mixture, preparing an electrolyte. Then, a lithium fuel cell was fabricated according to the same method as Comparative Example 5 except for the electrolyte.

Comparative Example 8

A mixed solvent was prepared by mixing ethylene carbonate, ethylene carbonate, ethylmethyl carbonate, and diethylcarbonate in a ratio of 30 volume %:20 volume %:50 volume %, and 1.3M of LiPF$_6$ was added thereto. Next, succinonitrile was added to the mixture in an amount of 5 wt % based on the entire weight of the mixture, preparing an electrolyte. Then, a lithium fuel cell was fabricated according to the same method as Comparative Example 5 except for the electrolyte.

Comparative Example 9

Positive active material slurry was prepared by mixing 94 wt % of a LiCoO$_2$ positive active material, 3 wt % of a carbon black conductive material, and 3 wt % of a polyvinylidene fluoride binder in N-methylpyrrolidone. The slurry was coated on an aluminum foil current collector and then, dried and compressed, fabricating a positive electrode.

92 wt % of a SiO$_x$ (x=0.99) negative active material and 8 wt % of a polyamideimide binder were mixed in N-methylpyrrolidone to prepare a negative active material slurry.

This slurry was coated on a copper foil current collector and then, dried and compressed, fabricating a negative electrode.

A mixed solvent was prepared by mixing fluoroethylene carbonate, ethylene carbonate, ethylmethyl carbonate, and diethylcarbonate in a ratio of 10 volume %:20 volume %:20 volume %:50 volume %, and 1.3M of LiPF$_6$ was added thereto. Next, succinonitrile was added to the mixture in an amount of 5 wt % based on the entire weight of the mixture, preparing an electrolyte.

Then, a separator was prepared by preparing a coating layer composition by mixing Al(OH)$_3$ and a meta-aramid resin in a ratio of 80:20 wt % in an N-methylpyrrolidone solvent and coating the coating layer composition on both sides of a 10 µm-thick polyethylene substrate to form a 5 µm-thick coating layer including Al(OH)$_3$ and an aramid resin.

The positive electrode, the negative electrode, the electrolyte, and the separator were used to fabricate a lithium fuel cell.

Comparative Example 10

A mixed solvent was prepared by mixing fluoroethylene carbonate, ethylene carbonate, ethylmethyl carbonate, and diethylcarbonate in a ratio of 20 volume %:10 volume %:20 volume %:50 volume %, and 1.0M of $LiPF_6$ was added thereto. Next, succinonitrile was added to the mixture in an amount of 5 wt % based on the entire weight of the mixture, preparing an electrolyte. Then, a lithium fuel cell was fabricated according to the same method as Comparative Example 9 except for the electrolyte.

Comparative Example 11

A mixed solvent was prepared by mixing fluoroethylene carbonate, ethylmethyl carbonate, and diethylcarbonate in a ratio of 30 volume %:20 volume %:50 volume %, and 1.0M of $LiPF_6$ was added thereto. Next, succinonitrile was added to the mixture in an amount of 5 wt % based on the entire weight of the mixture, preparing an electrolyte. Then, a lithium fuel cell was fabricated according to the same method as Comparative Example 9 except for the electrolyte.

Comparative Example 12

A mixed solvent was prepared by mixing ethylene carbonate, ethylmethyl carbonate, and diethylcarbonate in a ratio of 30 volume %:20 volume %:50 volume %, and 1.3M of $LiPF_6$ was added thereto. Next, succinonitrile was added to the mixture in an amount of 5 wt % based on the entire weight of the mixture, preparing an electrolyte. Then, a lithium fuel cell was fabricated according to the same method as Comparative Example 9 except for the electrolyte.

Comparative Example 13

A separator was prepared by preparing a coating layer composition by mixing $Mg(OH)_2$ and a meta-aramid resin in a ratio of 80:20 wt % in an N-methylpyrrolidone solvent and coating the coating layer composition on both sides of a 10 μm-thick polyethylene substrate to form a 5 μm-thick coating layer including $Mg(OH)_2$ and an aramid resin.

Positive active material slurry was prepared by mixing 94 wt % of a $LiCoO_2$ positive active material, 3 wt % of a carbon black conductive material, and 3 wt % of a polyvinylidene fluoride binder in N-methylpyrrolidone. The slurry was coated on an aluminum foil current collector and then, dried and compressed, fabricating a positive electrode.

A negative active material slurry was prepared by mixing 92 wt % of a $SiO_x$ (x=0.99) negative active material and 8 wt % of a polyamideimide binder in N-methylpyrrolidone. This slurry was coated on a copper foil current collector and then, dried and compressed, fabricating a negative electrode.

Then, a mixed solvent was prepared by mixing fluoroethylene carbonate, ethylene carbonate, ethylmethyl carbonate, and diethylcarbonate in a ratio of 10 volume %:20 volume %:20 volume %:50 volume %, and 1.3M of $LiPF_6$ was added thereto. Next, succinonitrile was added to the mixture in an amount of 5 wt % based on the entire weight of the mixture, preparing an electrolyte.

The separator, the positive electrode, the negative electrode, and the electrolyte were used to fabricate a lithium fuel cell.

Comparative Example 14

A mixed solvent was prepared by mixing fluoroethylene carbonate, ethylene carbonate, ethylmethyl carbonate, and diethylcarbonate in a ratio of 20 volume %:10 volume %:20 volume %:50 volume %, and 1.0M of $LiPF_6$ was added thereto. Next, succinonitrile was added to the mixture in an amount of 5 wt % based on the entire weight of the mixture, preparing an electrolyte. Then, a lithium fuel cell was fabricated according to the same method as Comparative Example 13 except for the electrolyte.

Comparative Example 15

A mixed solvent was prepared by mixing fluoroethylene carbonate, ethylmethyl carbonate, and diethylcarbonate in a ratio of 30 volume %:20 volume %:50 volume %, and 1.0M of $LiPF_6$ was added thereto. Next, succinonitrile was added to the mixture in an amount of 5 wt % based on the entire weight of the mixture, preparing an electrolyte. Then, a lithium fuel cell was fabricated according to the same method as Comparative Example 1 except for the electrolyte.

Comparative Example 16

A mixed solvent was prepared by mixing ethylene carbonate, ethylmethyl carbonate, and diethylcarbonate in a ratio of 30 volume %:20 volume %:50 volume %, and 1.3M of $LiPF_6$ was added thereto. Next, succinonitrile was added to the mixture in an amount of 5 wt % based on the entire weight of the mixture, preparing an electrolyte. Then, a lithium fuel cell was fabricated according to the same method as Comparative Example 13 except for the electrolyte.

The lithium fuel cells according to Examples 1 to 4 and Comparative Examples 1 to 4 were 100 times charged with 0.8C and discharged with 1C at room temperature of 25° C. Then, a ratio of $100^{th}$ discharge capacity against $1^{st}$ discharge capacity was calculated for cycle-life characteristic at room temperature. The results are provided in the following Table 1.

The lithium fuel cells according to Examples 1 to 4 and Comparative Examples 1 to 4 were 100 times charged with 0.8C and discharged with 1C at a high temperature of 45° C. Likewise, a ratio of $100^{th}$ discharge capacity against $1^{st}$ discharge capacity was calculated for cycle-life characteristic at a high temperature. The results are provided in the following Table 1.

TABLE 1

| electrolyte | | positive active material: NCA + LNO negative active material: $SiO_x$ without separator coating layer | | | positive active material: NCA + LNO negative active material: $SiO_x$ separator coating layer: $Al(OH)_3$ | | | positive active material: NCA + LNO negative active material: $SiO_x$ separator coating layer: $Mg(OH)_2$ | |
|---|---|---|---|---|---|---|---|---|---|
| solution composition | | r.t. cycle-life (%) | h.t. cycle-life (%) | | r.t. cycle-life (%) | h.t. cycle-life (%) | | r.t. cycle-life (%) | h.t cycle-life (%) |
| FEC 0 volume % | Comp. Ex. 4 | 85 | 53 | Ex. 4 | 86 | 80 | Ex. 8 | 85 | 78 |

TABLE 1-continued

| electrolyte solution composition | positive active material: NCA + LNO negative active material: SiO$_x$ without separator coating layer | | | positive active material: NCA + LNO negative active material: SiO$_x$ separator coating layer: Al (OH)$_3$ | | | positive active material: NCA + LNO negative active material: SiO$_x$ separator coating layer: Mg (OH)$_2$ | | |
|---|---|---|---|---|---|---|---|---|---|
| | | r.t. cycle-life (%) | h.t. cycle-life (%) | | r.t. cycle-life (%) | h.t. cycle-life (%) | | r.t. cycle-life (%) | h.t cycle-life (%) |
| FEC 10 volume % | Comp. Ex. 1 | 87 | 51 | Ex. 1 | 87 | 79 | Ex. 5 | 88 | 79 |
| FEC 20 volume % | Comp. Ex. 2 | 92 | 47 | Ex. 2 | 91 | 81 | Ex. 6 | 90 | 79 |
| FEC 30 volume % | Comp. Ex. 3 | 92 | 48 | Ex. 3 | 91 | 80 | Ex. 7 | 91 | 81 |

In Table 1, NCA+LNO indicate a positive active material prepared by mixing LiNi$_{0.8}$Co$_{0.15}$Al$_{0.05}$O$_2$ and Li$_2$NiO$_2$. FEC indicates fluoroethylene carbonate.

Furthermore, in Table 1, r.t. indicates room temperature, and h.t. indicates high temperature. In Table 1, Comp. Ex. indicates comparative example, and Ex. indicates example.

As shown in Table 1, the lithium fuel cells including a separator prepared by coating Al(OH)$_3$ on a polyethylene substrate according to Examples 1 to 4 and by coating on Mg(OH)$_2$ a polyethylene substrate according to Examples 5 to 8 had almost similar cycle-life characteristic at room and high temperatures. In other words, the lithium fuel cells according to Examples 1 to 8 had almost no cycle-life characteristic degradation at a high temperature. On the contrary, the ones of Comparative Examples 1 to 4 had abruptly deteriorated cycle-life characteristic at a high temperature.

In addition, the lithium fuel cells according to Comparative Example 5 to 16 were 100 times charged with 0.8C and discharged with 1C at room temperature of 25° C. Then, a ratio of 100th discharge capacity against 1st discharge capacity was calculated for cycle-life characteristic at room temperature. The result is provided in the following Table 2. They were also 100 times charged with 0.8C and discharged with 1C at a high temperature of 45° C. Then, a ratio of 100th discharge capacity against 1st discharge capacity was calculated for cycle-life characteristic at a high temperature. The results are provided in the following Table 2.

Mg(OH)$_2$, the lithium fuel cells had little cycle-life characteristic improvement at high temperature.

As shown in Tables 1 and 2, when a lithium nickel-based positive active material, an SiO$_x$ negative active material, and a polyethylene film separator coated with Al(OH)$_3$ or Mg(OH)$_2$ and FEC was used, the lithium fuel cells had improved cycle-life characteristic at room and high temperatures.

In addition, when a cobalt-based positive active material and an SiOx negative active material were used, there was no additional effect due to polyethylene film separator coated with Al(OH)$_3$ or Mg(OH)$_2$.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments are exemplary in every way but not limited.

What is claimed is:

1. A separator for a rechargeable lithium battery, comprising:
    a polymer substrate; and
    a coating layer comprising a hydroxide compound disposed on the polymer substrate

TABLE 2

| electrolyte solution composition | positive active material: LCO negative active material: SiO$_x$ without separator coating layer | | | positive active material: LCO negative active material: SiO$_x$ separator coating layer: Al (OH)$_3$ | | | positive active material: LCO negative active material: SiO$_x$ separator coating layer: Mg (OH)$_2$ | | |
|---|---|---|---|---|---|---|---|---|---|
| | | r.t. cycle-life (%) | h.t. cycle-life (%) | | r.t. cycle-life (%) | h.t. cycle-life (%) | | r.t. cycle-life (%) | h.t. cycle-life (%) |
| FEC 0 volume % | Comp. Ex. 8 | 68 | 71 | Comp. Ex. 12 | 70 | 75 | Comp. Ex. 16 | 71 | 76 |
| FEC 10 volume % | Comp. Ex. 5 | 74 | 77 | Comp. Ex. 9 | 75 | 79 | Comp. Ex. 13 | 74 | 78 |
| FEC 20 volume % | Comp. Ex. 6 | 81 | 78 | Comp. Ex. 10 | 82 | 85 | Comp. Ex. 14 | 83 | 84 |
| FEC 30 volume % | Comp. Ex. 7 | 85 | 82 | Comp. Ex. 11 | 87 | 90 | Comp. Ex. 15 | 86 | 88 |

In the Table 2, LCO indicates LiCoO$_2$.

Furthermore, in Table 2, r.t. indicates room temperature, and h.t. indicates high temperature. In Table 2, Comp. Ex. indicates comparative example, and Ex. indicates example.

As shown in Table 2, when LiCoO$_2$ was used as a positive active material, the lithium fuel cells had almost no high temperature cycle-life degradation. Accordingly, when used was a polyethylene film separator coated with Al(OH)$_3$ or wherein the hydroxide compound comprises Al(OH)$_3$, Mg(OH)$_2$, Ti(OH)$_4$, or Si(OH)$_4$, or a combination thereof and is present in the coating layer at 50 wt % to 90 wt % based on the entire weight of the coating layer; and wherein the coating layer is positioned between the polymer substrate and an active material layer in the rechargeable lithium battery.

2. The separator of claim 1, wherein the coating layer further comprises a heat-resistant resin.

3. The separator of claim 1, wherein the coating layer further comprises a heat-resistant resin including an aramid resin, a polyamideimide resin, or a polyimide resin, or a combination thereof.

4. The separator of claim 1, wherein the coating layer further comprises a heat-resistant resin, and the mixing ratio of the hydroxide compound and the heat-resistant resin is 50:50 to 90:10 wt %.

5. The separator of claim 1, wherein the polymer substrate is a substrate including a polyolefin resin.

6. The separator of claim 1, wherein the coating layer is disposed on one side of the polymer substrate or both sides of the polymer substrate.

7. The separator of claim 1, wherein the polymer substrate has a thickness of 8 μm to 20 μm.

8. The separator of claim 1, wherein the coating layer has a thickness of 2 μm to 8 μm.

9. A separator for a rechargeable lithium battery, comprising:
   A polymer substrate; and
   a coating layer consisting essentially of a hydroxide compound and a heat-resistant resin, disposed on a polymer substrate;
   wherein the hydroxide compound comprises $Al(OH)_3$, $Mg(OH)_2$, $Ti(OH)_4$, or $Si(OH)_4$, or a combination thereof and is present in the coating layer at 50 wt % to 90 wt % based on the entire weight of the coating layer; and
   wherein the coating layer is positioned between the polymer substrate and an active material layer in the rechargeable lithium battery.

10. The separator for a rechargeable lithium battery of claim 9, wherein the mixing ratio of the hydroxide compound and the heat-resistant resin is 50:50 to 90:10 wt % in the coating layer.

* * * * *